United States Patent [19]

Baur et al.

[11] Patent Number: 4,580,796
[45] Date of Patent: Apr. 8, 1986

[54] HYDRAULIC CLAMPING NUT

[75] Inventors: Manfred Baur, Ulm-Jungingen; Monika Schrem, Giengen, both of Fed. Rep. of Germany

[73] Assignee: Albert Schrem Werkzeugfabrik GmbH, Giengen, Fed. Rep. of Germany

[21] Appl. No.: 480,359

[22] Filed: Mar. 30, 1983

[30] Foreign Application Priority Data

Apr. 10, 1982 [DE] Fed. Rep. of Germany ....... 3213483

[51] Int. Cl.$^4$ ............................................. B23B 31/30
[52] U.S. Cl. ....................................................... 279/4
[58] Field of Search .................................... 279/4, 2 A

[56] References Cited

U.S. PATENT DOCUMENTS

| 2,462,155 | 2/1949 | Benjamin et al. | 279/4 |
| 2,911,222 | 11/1959 | Eve | 279/4 |
| 2,982,557 | 5/1961 | Anschutz | 279/4 |
| 3,072,416 | 1/1963 | Leifer | 279/4 |
| 3,130,978 | 4/1964 | Van Roojen | 279/4 |
| 3,516,681 | 6/1970 | Cox et al. | 279/4 |
| 3,592,482 | 7/1971 | Better | 279/4 |
| 4,387,906 | 6/1983 | Nicolin | 279/4 |

FOREIGN PATENT DOCUMENTS

| 937039 | 11/1973 | Canada | 279/4 |
| 91891 | 10/1983 | European Pat. Off. | 279/4 |
| 2552873 | 5/1977 | Fed. Rep. of Germany | 279/4 |
| 382517 | 11/1964 | Switzerland | 279/4 |
| 1066211 | 4/1967 | United Kingdom | 279/4 |
| 1345923 | 2/1974 | United Kingdom | 279/4 |
| 2074056 | 10/1981 | United Kingdom | 279/4 |
| 2100627 | 1/1983 | United Kingdom | 279/4 |

Primary Examiner—William R. Briggs
Attorney, Agent, or Firm—Shenier & O'Connor

[57] ABSTRACT

The invention relates to a hydraulic clamping means, in particular, a clamping nut, for mutual axial clamping of two workpiece sections or machine parts, in particular, a collet and a chuck, comprising an annular housing engaging one workpiece section or machine part, at least one pressure chamber arranged in the housing and filled with hydraulic medium, a pressure screw screwable into this chamber, and an annular pressure area provided in the housing and connected to the pressure chamber, with an annular piston engaging the other workpiece section or machine part axially displaceable in the annular pressure area. To enable direct clamping of two workpiece sections or machine parts in the clamping means itself, the housing and the annular piston comprise clamping surfaces which are directed inwardly and towards one another and each engage one of the workpiece sections or machine parts respectively, and the pressure area, the housing and the annular piston are so constructed and arranged in relation to one another that increasing pressure causes an axial relative displacement of the clamping surfaces towards one another.

4 Claims, 6 Drawing Figures

HYDRAULIC CLAMPING NUT

BACKGROUND OF THE INVENTION

1. Field of the Invention

The invention relates to a hydraulic clamping nut for mutual axial clamping of two workpiece sections or machine parts, in particular, a collet and a chuck, comprising an annular housing engaging one workpiece section or machine part, at least one pressure chamber arranged in the housing and filled with hydraulic medium, a pressure screw screwable into this chamber, and an annular pressure area provided in the housing and connected to the pressure chamber, with an annular piston engaging the other workpiece section or machine part axially displaceable in the annular pressure area.

2. Description of the Prior Art

The known hydraulic clamping means of this kind (German Offenlegungsschrift No. 25 52 873) comprise a clamping member which is connected to the annular piston and is pushed under the effect of the hydraulic pressure out of the annular housing. It is, therefore, not possible for two workpiece sections or machine parts arranged directly in the clamping means to be clamped together, but rather a separate counterstop is required for the part to be clamped.

SUMMARY OF THE INVENTION

The object underlying the invention is to so construct a hydraulic clamping means, in particular, a clamping nut, that two workpiece sections or machine parts can be clamped together in the clamping means itself independently of a spatially separate counterstop.

The object is attained in accordance with the invention in that the housing and the annular piston comprise clamping surfaces which are directed inwardly and towards one another and each engage one of the workpiece sections or machine parts respectively, and the pressure area, the housing and the annular piston are so constructed and arranged in relation to one another that increasing pressure causes an axial relative displacement of the clamping surfaces towards one another.

BRIEF DESCRIPTION OF THE DRAWINGS

The invention will now be described in greater detail with reference to preferred embodiments and the attached drawings, in which.

DESCRIPTION OF THE PREFERRED EMBODIMENTS

Figure 1:
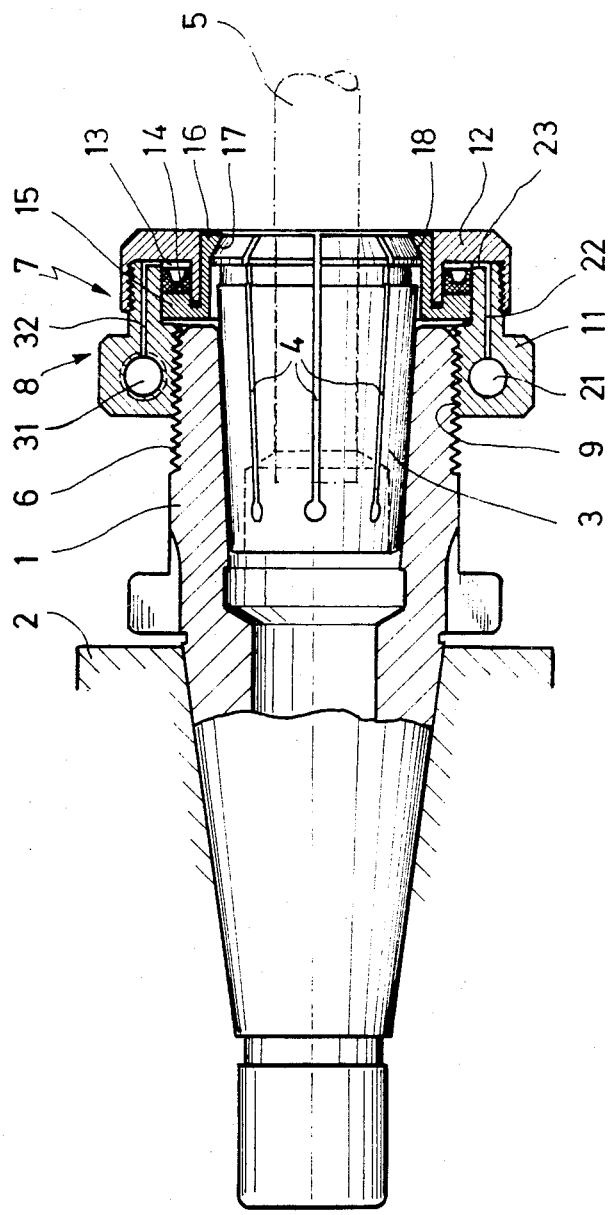
FIG. 1 is a partially exposed view of a collet with a chuck and a clamping nut screwed onto the chuck.

FIG. 1 shows a conventional chuck 1 which is rigidly clamped in a rotating drilling or milling spindle 2, illustrated only schematically in FIG. 1. Inserted in conventional manner in the conical interior of the chuck is a complementarily conical collet 5 which is of hollow configuration and contains in its side wall slits 4 extending radially into the slide cavity. Inserted in the collet 3 is a tool 5, for example, a drill or mill. When the conical collet 3 is pushed into the conical interior of the chuck 1, the tool 5 is rigidly clamped and connected for rotational movement with the spindle 2.

Figure 2:
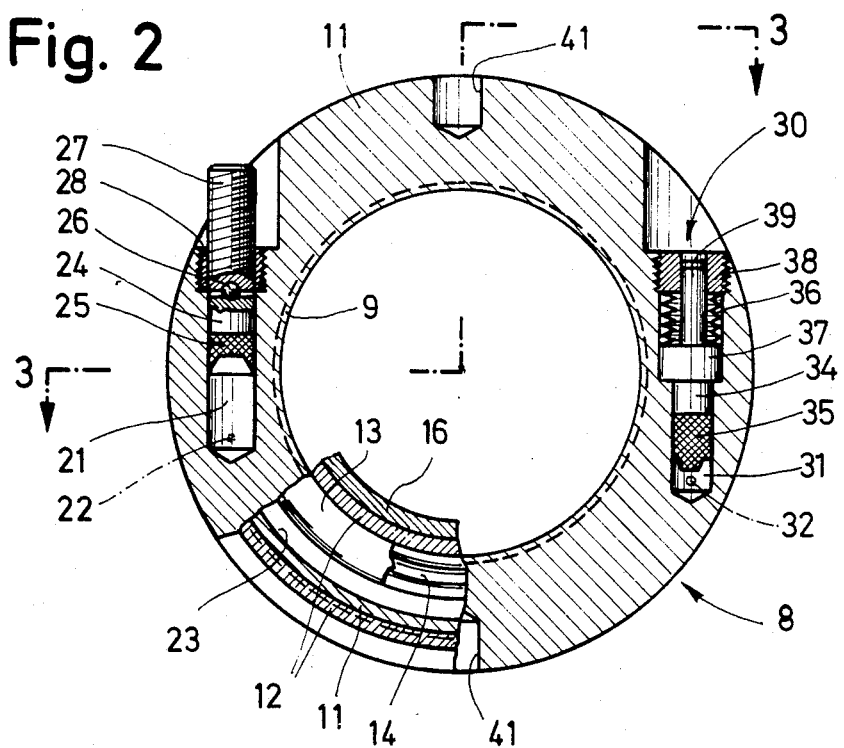
FIG. 2 is a partially exposed top view of the clamping nut taken along line 2—2 in FIG. 3.
Figure 3:
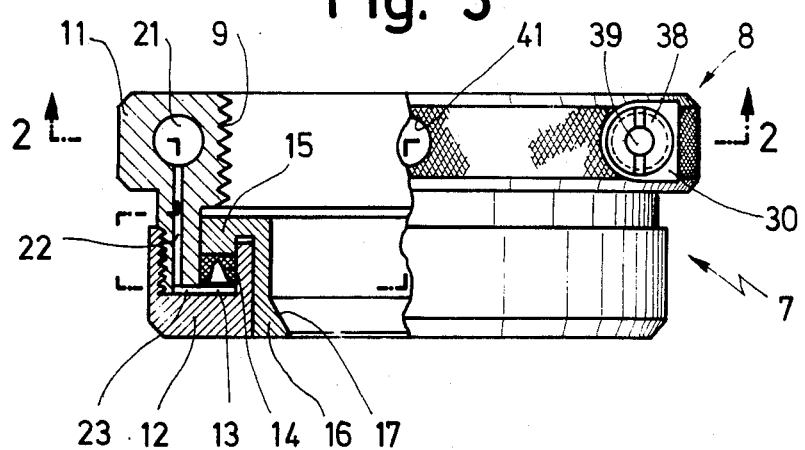
FIG. 3 is a partially exposed side view of the clamping nut taken along line 3—3 in FIG. 2.

This insertion of the collet into the chuck 1 is enabled by a hydraulic clamping nut 7 which is screwed onto an external thread 6 of the chuck 1-vide also FIGS. 2 and 3. The clamping nut 7 includes an annular housing 8 which is screwed onto the external thread 6 of the chuck 1 by means of an internal thread 9. The housing 8 consists of two coaxial housing sections 11, 12, which are rigidly or releasably connected to each other, for example, by a screw connection. Both housing sections 11, 12 are likewise of annular configuration. The two housing sections 11, 12 form between them an annular pressure area 13 into which an annular piston 15 engages for displacement in axial direction of the housing 8, with a seal 14 interposed therebetween. The annular piston 15 has the cross-sectional profile apparent from the drawings and forms an integral unit with a clamping member 16 which is provided with a clamping surface 17 facing into the interior of the housing 8. The conical clamping surface 17 in the embodiment of a clamping nut shown in FIGS. 1 to 3 engages a complementarily conical edge surface 18 of the collet 3.

The annular pressure area 13 is filled with a hydraulic medium. When a hydraulic pressure builds up in the area 13, the annular piston 15 is pushed into the interior of the housing 8 (to the left in FIG. 1 and upwardly in FIG. 3), whereby the collet 3 is pressed into the chuck 1. This, in turn, results in the tool 5 being rigidly clamped.

As illustrated, the housing sections 11, 12 form between them a sliding guide surface for the annular piston 15 of the clamping member 16; the inside surface of the housing section 12 facing the collet 3 may also act as sliding or guiding surface for the annular piston and clamping member. The annular piston 15 and the clamping member 16 encompass so to speak one of the walls of the pressure area 13.

As is apparent, in particular, from FIGS. 2 and 3, the housing 8 comprises in the housing section 11 a pressure chamber 21 which is connected to the pressure area 13 by a conduit 22 and a notch 23 on the underside of the housing section 11. The pressure chamber 21, the conduit 22 and the notch 23 are likewise filled with hydraulic medium. The pressure chamber 21 furthermore contains a piston 24 with a seal 25. A pressure screw 27 which is rotatable by means of an external thread in the internal thread of a threaded section 28 engages the piston 24, with a ball 26 interposed therebetween. The threaded section 28, in turn, is rigidly screwed into the housing section 11. When the pressure screw 27 is turned in the appropriate direction, the piston 24 is displaced axially inwardly in the pressure chamber 21 so that a hydraulic pressure builds up, propagates into the pressure area 13 and acts there on the annular piston 15.

As likewise apparent from FIGS. 2 and 3, the housing 8 further comprises in the housing section 11 a clamping force indicator 30. This includes a pressure chamber 31 which is connected to the pressure area 13 by a conduit 32 and a notch corresponding to the notch 23. A piston 34 with a seal 35 is displaceable in the pressure chamber 31. The piston 34 is pressed inwardly by a set of springs 36, which is supported, on the one hand, at a collar 37 of the piston 34 and, on the other hand, at a theaded insert 38. The piston 34 carries an indicator pin 39 which may have scale marks on its circumference. Depending on the pressure existing in the pressure area 13, the piston 34 and with it the indicator pin are pushed more or less far out of the threaded insert 38 so as to provide an indication of the hydraulic pressure existing in the pressure area 13.

The recesses 41 on section 11 of the housing 8 which are to be seen in FIGS. 2 and 3 enable insertion of a tool to screw the housing with its internal thread 9 onto the external thread 6 of the chuck 1.

Figure 4:
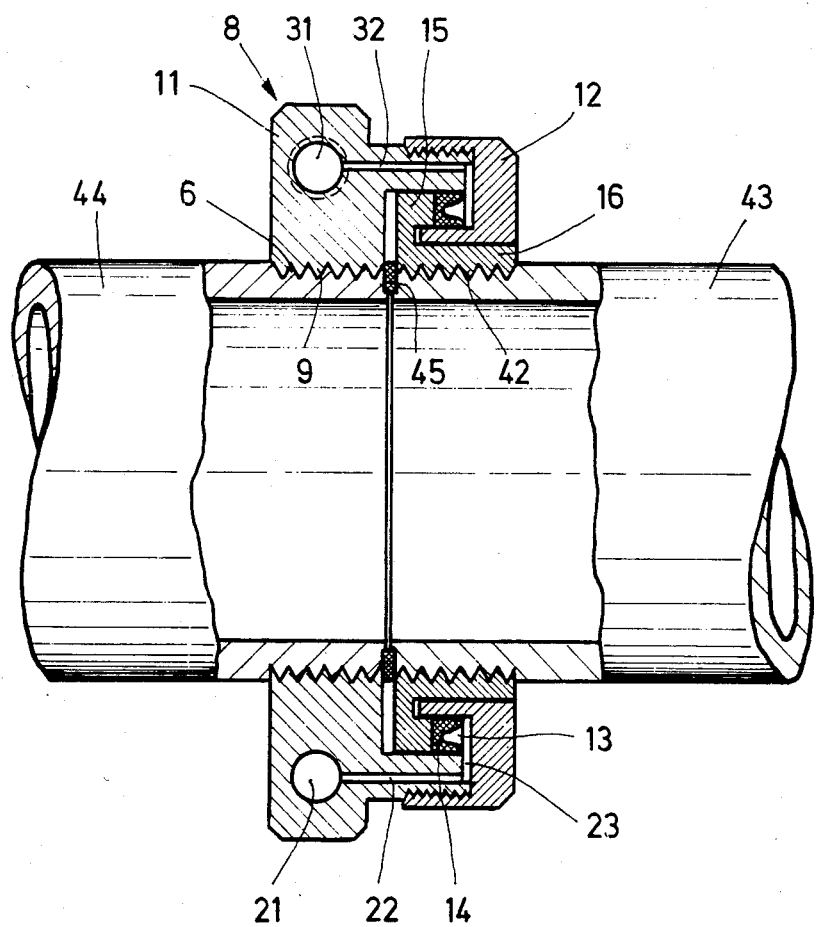
FIG. 4 is a modified embodiment of a clamping nut for clamping together two tubular workpieces.

FIG. 4 shows a modified embodiment of a clamping means. Corresponding parts are designated by the same reference numerals in FIGS. 1 to 3 and FIG. 4. The housing sections 11 and 12 of the housing 8 form between them the pressure area 13 in which the annular piston 15 carrying the clamping member 16 is displaceable. The inwardly directed surfaces of an internal thread 42 on the clamping member 16 act as clamping surfaces in the embodiment shown in FIG. 4.

The end of a tubular workpiece section 43 which is provided with an external thread is screwed into the internal thread 42. The housing 8 is screwed by means of the internal thread 9 provided on the housing section 11 onto a corresponding external thread 6 at the end of a likewise tubular workpiece 44. The two ends of the workpieces 43 and 44 can contact each other bluntly and directly or be separated by an inserted ring 45, which, for example, can be a gasket.

When a hydraulic pressure builds up in the pressure area 13 in the manner described hereinabove, the clamping member 16 is displaced and the workpiece 43 connected to it into the interior of the housing 8 and can thus be firmly clamped to the front end of the workpiece 44.

The embodiment shown in FIG. 4 enables, in particular, two tubes to be flanged together. Housing section 11 and clamping member 16 do not need to be secured to the workpieces 43, 44 by threaded connections. Annular flanges cooperating with corresponding shoulders or steps acting as clamping surfaces on housing section 11 and clamping member 16, respectively, could be provided on the workpieces 43, 44.

Figure 6:
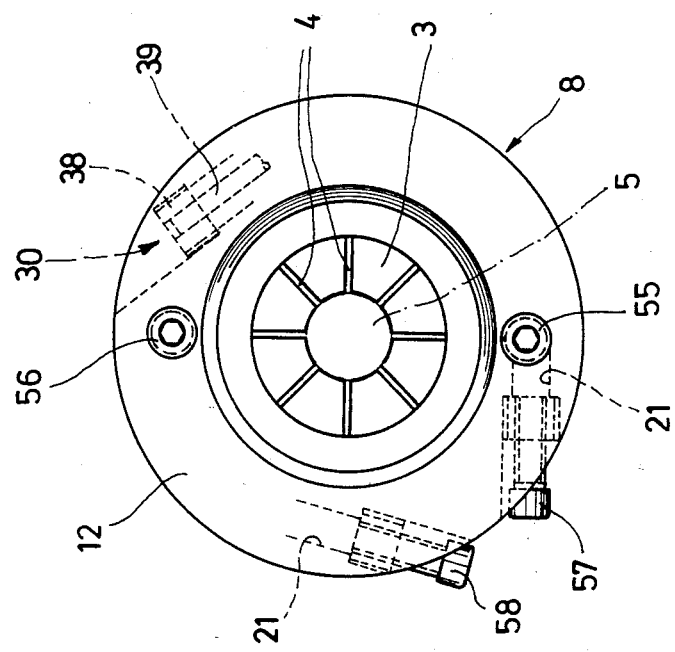
FIG. 6 is a top view of the clamping nut shown in FIG. 5.
Figure 5:
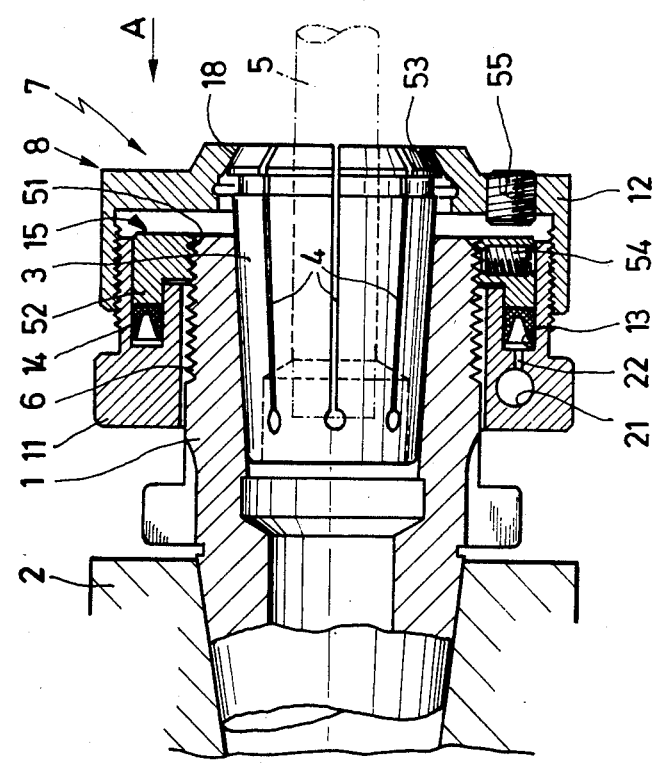
FIG. 5 is a further modified embodiment of a clamping nut.

A further embodiment of a hydraulic clamping nut according to the invention is illustrated in FIGS. 5 and 6. Corresponding parts in FIGS. 5 and 6 are designated by the same reference numerals as in FIGS. 1 to 4. An essential difference over the embodiment shown in FIG. 1 is that it is not the housing 8 again consisting of two sections 11, 12 that is rigidly connected to the chuck 1, but the annular piston 15, more particularly, by an internal thread 51 which insofar acts as a first clamping surface. The annular piston 15 comprises a ring land 52 which extends around its rear end and submerges into the annular pressure area 13. The pressure area 13 is provided in section 11 of the annular housng 8 which, in turn, embraces the chuck 1 in a loosely and axially freely displaceable manner. The housing section 12, in turn, overlaps the piston 15 and comprises on the side of the device opposite the ring land 52 a conical clamping surface 53, corresponding to the clamping surface 17 in FIG. 1, which is directed into the housing interior and faces the internal thread 51. This clamping surface 53 abuts the complementary conical edge surface 18 of the collet 3. If a pressure is built up in the annular pressure area 13, a tendency arises to push the housing 8 away from the insofar stationary annular piston 15 (to the left in FIG. 5) and to move the two clamping surfaces, namely the internal thread 51 and the conical surface 53 towards each other, whereby the internal diameter of the collet 3 is decreased and the tool 5 is thereby rigidly clamped. The embodiment shown in FIGS. 5 and 6 corresponds insofar approximately to the embodiment according to FIG. 4, where similarly upon generation of a pressure in the annular pressure area 13, the two clamping surfaces formed by the internal threads 9 and 42, respectively, on the housing 8 and the piston 15 are moved together so as to firmly clamp the two workpiece sections 43, 44 together. Instead of the internal thread 9 in the embodiment in FIG. 4, the conical clamping surface 53 is provided in the embodiment according to FIG. 5.

As is further apparent from FIGS. 5 and 6, the embodiment shown therein comprises in the piston 15 a grub screw 54 which enables the ring piston 15 screwed onto the external thread of the chuck 1 to be clamped such as to prevent rotation thereof. The grub screw 54 is, as apparent from FIG. 5, so short that it does not protrude beyond the external circumference of the piston 15 and the housing section 11 is insofar not obstructed in its displacement motion relative to the piston 15.

Provided at the front end of the housing section 12 are two further screws 55, 56 in the form of hexagonal screws, only one of which is shown in FIG. 5. If these screws 55, 56 are turned inwardly, their inside ends contact the front end of the piston 15. This enables the housing 8 to be pushed back from the annular piston 15 when the pressure in the pressure area 13 is relaxed.

In the embodiment shown in FIGS. 1 and 3 of the invention, only one single pressure chamber 21 with a pressure screw 27 is provided. As is apparent from FIG. 6, the embodiment shown therein comprises two pressure screws 57, 58 which correspond to the pressure screw 27 in FIG. 2. Both pressure screws 57, 58 act in the same way as the pressure screw 27, but enable, since there are two of them, a higher pressure to be built up in the respective pressure chambers and consequently in the pressure area 13.

Finally, the embodiment shown in FIGS. 5 and 6 also comprises a clamping force indicator 30 with a threaded insert 38 and an indicator pin 39 corresponding to the embodiment shown in FIG. 2.

The clamping nut shown in FIGS. 5 and 6 is used in the following manner: First, the housing section 11 comprising the clamping screws 57, 58 and containing the pressure medium sealed off from the outside by the annular seal 14 is pushed loosely over the chuck 1 (to the left in FIG. 5). The annular piston 15 is then screwed separately from the housing section 11 onto the external thread of the chuck 1. The housing section 11 is subsequently pushed (to the right in FIG. 5) until the ring land 52 of the piston 15 submerges into the annular groove of the housing section 11 and abuts the seal 14. The housing section 12 is then screwed onto the housing section 11 until the conical clamping surface 53 loosely abuts the conical edge surface 18 of the collet 3. By appropriately turning the two clamping screws 57, 58 a hydraulic pressure is built up in the pressure area 13, which causes the piston 15 and the housing 8 to move towards each other and on account of the conical clamping surfaces 53 of the housing section 12 abutting the collet 3, the tool 5 inserted therein is rigidly clamped.

What is claimed is:

1. Hydraulic clamping nut for mutual axial clamping of a pair of workpiece such as a collet having a conical edge surface and a chuck embracing the collet and being provided with an external thread (6), comprising an annular housing (8), at least one pressure chamber arranged in the housing and filled with hydraulic medium, a pressure screw screwable into this chamber, an annular pressure area provided in the housing and connected to the pressure chamber and an annular piston axially displaceable in the annular pressure area, the housing (8) and the annular piston (15) having clamping surfaces (51, 53) directed inwardly and towards one another and the pressure area (13), the housing (8) and the annular piston (15) being so constructed and arranged in relation to one another that increasing pressure in the annular pressure area (13) causes an axial relative displacement of the clamping surfaces towards one another, the improvement being the annular piston (15) having as a clamping surface an internal thread (51) and being screwed onto the external thread (6) of the chuck; the annular piston (15) having furthermore a ring land (52) submerging into the annular pressure area (13) of the housing (8); the housing (8) comprising first and second sections (11, 12); the first section (11) being provided with said annular pressure area (13) and embracing the chuck (1) in loosely and axially freely displaceable manner; the second section (12) having on its side opposite the ring land (52) of the piston (15) a conical clamping surface (53) abuting the conical edge surface (18) of the collet (3).

2. Hydraulic clamping nut according to claim 1, whereby a grub screw (54) is inserted into the annular piston (15) and screwed onto the external thread (6) of the chuck (1) to prevent rotation of the piston on the chuck.

3. Hydraulic clamping nut according to claim 1, whereby two screws (55, 56) are provided at the front end of the second housing section (12), the inside ends of these screws contacting the front end of the annular piston (15) to push the housing (8) back from the piston (15), when the pressure in the pressure area (13) is relaxed.

4. Hydraulic clamping nut according to claim 3, whereby a pressing or clamping force indicator (30) is connected to the pressure area (13).

* * * * *